(12) United States Patent
Chun et al.

(10) Patent No.: US 8,464,107 B2
(45) Date of Patent: Jun. 11, 2013

(54) SURROGATE CIRCUIT FOR TESTING AN INTERFACE

(75) Inventors: Christopher Kong Yee Chun, Austin, TX (US); Anand Srinivasan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 436 days.

(21) Appl. No.: 12/824,783

(22) Filed: Jun. 28, 2010

(65) Prior Publication Data

US 2011/0320894 A1 Dec. 29, 2011

(51) Int. Cl.
*G01R 31/28* (2006.01)
*H01L 23/02* (2006.01)
*H01L 23/48* (2006.01)

(52) U.S. Cl.
USPC ........... 714/724; 714/715; 714/742; 714/733; 257/678; 257/686; 257/693

(58) Field of Classification Search
USPC .................. 714/724, 718, 733, 742; 257/678, 257/686, 693
See application file for complete search history.

(56) References Cited

U.S. PATENT DOCUMENTS

| 4,674,089 | A | | 6/1987 | Poret et al. | |
|---|---|---|---|---|---|
| 7,075,175 | B2 | * | 7/2006 | Kazi et al. | 257/678 |
| 7,562,271 | B2 | * | 7/2009 | Shaeffer et al. | 714/724 |
| 7,568,135 | B2 | * | 7/2009 | Cornwell et al. | 714/721 |
| 7,772,831 | B2 | * | 8/2010 | Kazi et al. | 324/762.03 |
| 7,979,757 | B2 | * | 7/2011 | Jeddeloh | 714/718 |
| 8,032,804 | B2 | * | 10/2011 | Jeddeloh | 714/721 |
| 8,120,958 | B2 | * | 2/2012 | Bilger et al. | 365/185.11 |
| 8,127,202 | B2 | * | 2/2012 | Cornwell et al. | 714/764 |
| 8,234,528 | B2 | * | 7/2012 | Jeddeloh | 714/721 |
| 2003/0225567 | A1 | | 12/2003 | Koch et al. | |
| 2004/0019827 | A1 | | 1/2004 | Rohfleisch et al. | |
| 2006/0087013 | A1 | * | 4/2006 | Hsieh | 257/678 |
| 2007/0152313 | A1 | * | 7/2007 | Periaman et al. | 257/686 |
| 2007/0194425 | A1 | * | 8/2007 | Zingher | 257/686 |
| 2008/0001266 | A1 | * | 1/2008 | Yu et al. | 257/678 |
| 2009/0045489 | A1 | * | 2/2009 | Koon et al. | 257/666 |
| 2011/0037159 | A1 | * | 2/2011 | McElrea et al. | 257/686 |
| 2011/0215453 | A1 | * | 9/2011 | Eng et al. | 257/666 |
| 2011/0271158 | A1 | * | 11/2011 | Jeddeloh | 714/719 |

OTHER PUBLICATIONS

International Search Report and Written Opinion—PCT/US2011/042089—ISA/EPO—Oct. 4, 2011.

* cited by examiner

*Primary Examiner* — John J Tabone, Jr.
(74) *Attorney, Agent, or Firm* — Michelle Gallardo

(57) ABSTRACT

A semiconductor die includes interface logic for performing a function on an external device, and a surrogate circuit in communication with the interface logic. The interface logic facilitates testing of the interface logic by attempting to perform the function on the surrogate circuit. The interface logic may be a memory interface, and the surrogate circuit may be a memory circuit that is a smaller and simpler replica of an external memory die. The surrogate circuit allows the interface logic to be tested before the semiconductor die is physically coupled to the external device, for exampled in a three dimensional (3D) integrated circuit (IC).

24 Claims, 5 Drawing Sheets

SURROGATE CIRCUIT FOR TESTING AN INTERFACE

TECHNICAL FIELD

The present description relates, generally, to semiconductor die testing and, more specifically, to testing interfaces on semiconductor dies.

BACKGROUND

FIG. 1 is an exploded view of a conventional chip package 100. The chip package 100 includes a memory die 101 and the logic die 102. In this example, the dies 101, 102 are stacked in the chip package 100 and communicate with each other using Through Silicon Vias (TSVs) 103. The TSVs 103 are vias extending through the semiconductor materials of each of the dies 101, 102.

The logic die 102 includes an External Bus Interface (EBI) 105, which is a memory controller and interface between the logic die 102 and the memory die 101. The memory die 101 includes memory cells 104, which store information as instructed by the EBI 105.

One difficulty with the chip package 100 is that functionality of the EBI 105 is not tested until dies 101, 102 are physically interfaced. In other words, if the number of interface signals are larger than what an external tester can support, the testing procedure includes checking functionality of the EBI 105 by using the EBI 105 to store information to the memory cells 104. The information can be read out from the memory cells 104 to verify that the information was stored correctly. Once the dies 101, 102 are physically interfaced in the package 100, it is not practical to salvage one of the dies 101, 102 separately from the other. Therefore, if testing reveals a problem with the EBI 105, the whole chip package 100 is scrapped, even if the memory die 102 is fully functional. In other words, the conventional testing procedure can result in undesirably high scrap costs.

BRIEF SUMMARY

According to one embodiment, a semiconductor die includes interface logic for performing a function on an external device. The semiconductor die also includes a surrogate circuit in communication with the interface logic. The surrogate circuit has a similar operation to that of the external circuit, and the interface logic facilitates testing of the semiconductor die by attempting to perform the function on the surrogate circuit.

According to another embodiment, a method for testing a die is disclosed. The die has controller logic for controlling an external device and an on-chip surrogate circuit in communication with the controller logic. The method includes verifying operability of the controller logic by operating the controller logic on the on-chip surrogate circuit.

According to another embodiment, a method for testing a die is disclosed. The die has controller logic for controlling an external device and an on-chip surrogate circuit in communication with the controller logic. The method includes the step of verifying operability of the controller logic by operating the controller logic on the on-chip surrogate circuit.

According to yet another embodiment, a semiconductor die includes means for replicating characteristics of a memory device external to the semiconductor die. The semiconductor die also includes means for performing a function on the external memory device and for facilitating testing of the semiconductor die by attempting to perform the function on the replicating means.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific embodiments disclosed may be readily utilized as a basis for modifying or designing other structures for carrying out the same purposes of the present disclosure. It should also be realized by those skilled in the art that such equivalent constructions do not depart from the technology of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

Figure 1:
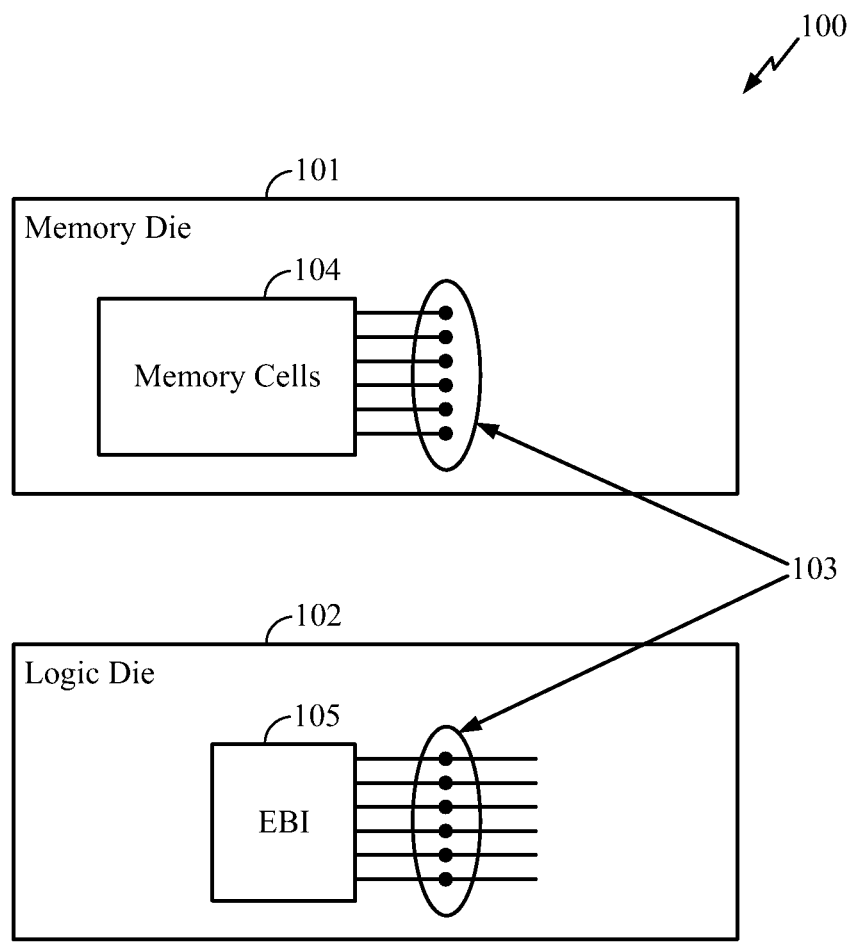
FIG. 1 is an exploded view of a conventional chip package.
Figure 2:
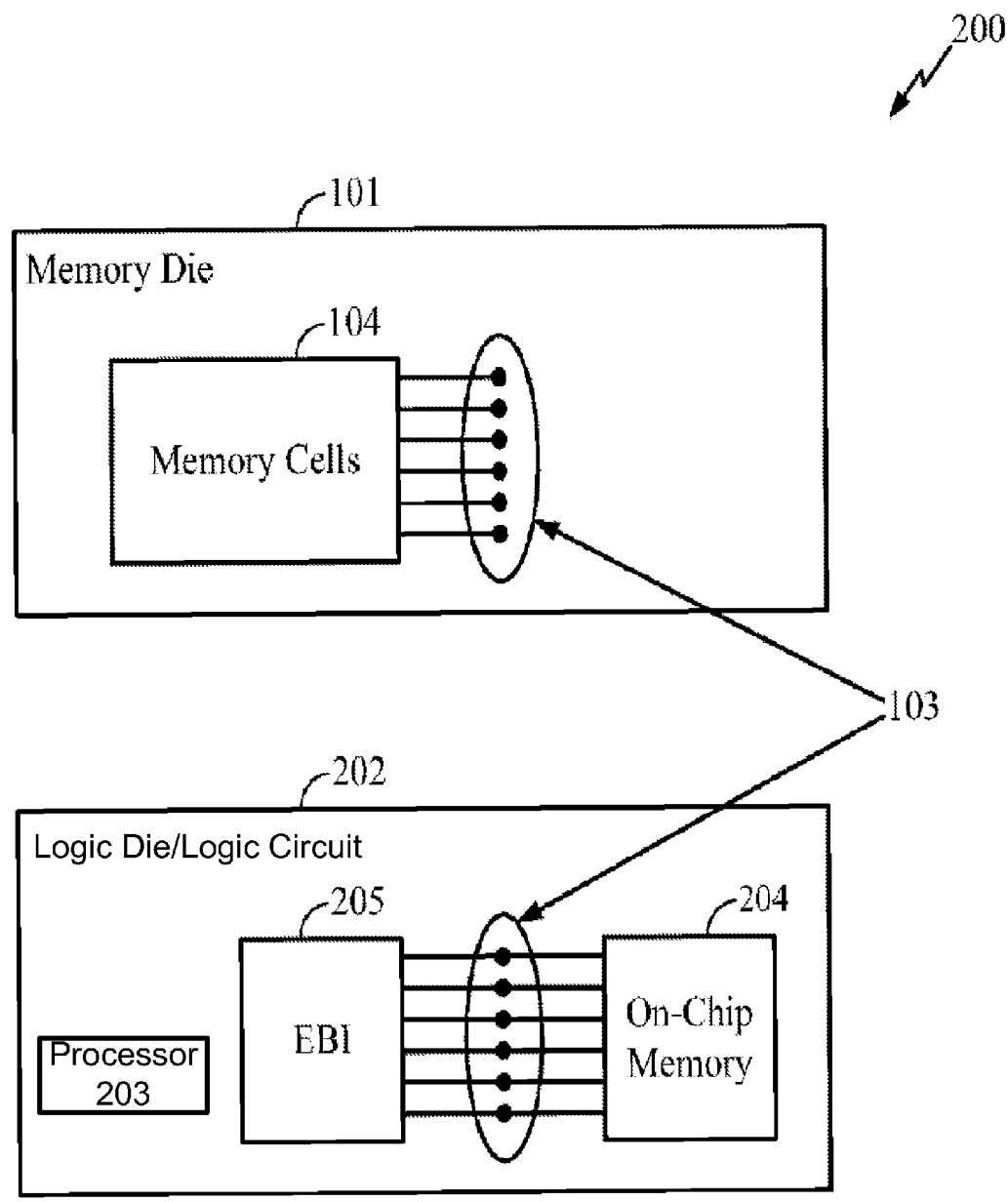
FIG. 2 is an exploded view of an exemplary chip package adapted according to one embodiment.

FIG. 2 is an exploded view of an exemplary chip package 200 adapted according to one embodiment. The chip package 200 includes the memory die 101, which includes the memory cells 104 and communicates with a logic die or logic circuit 202 using the Through Silicon Vias (TSVs) 103. While this example refers to silicon, other embodiments can be adapted using dies of different semiconductor materials, such as GaAs, or even glass. In other words, the term TSV is not limited to vias within silicon, rather the vias can be within other substrate materials.

The logic die 202 includes the EBI 205, which is in communication with both an on-chip memory 204 and the memory cells 104. The logic die may also include a processor 203. The on-chip memory 204 is in parallel with the connectivity of the memory cells 104 so that the EBI 205 can perform operations on the on-chip memory 204 as well as on the off-chip memory cells 104.

In this example, the on-chip memory 204 is a smaller, simpler surrogate for at least a portion of the memory cells 104. For instance, in some embodiments it is not necessary to include an on-chip memory the size of the memory cells 104 where a smaller and/or simpler on-chip memory that replicates the characteristics of the memory die 101 is adequate for testing purposes.

In an example testing process, the EBI 205 is tested before the dies 101 and 202 are physically interfaced. The testing includes attempting to perform a read and/or a write function on the on-chip memory 204 using the EBI 205. For instance, the EBI 205 can write information to the on-chip memory 204 in the same fashion that EBI 205 would write information to the memory cells 104. The information can then be read out of the on-chip memory 204 to verify that the EBI 205 is operating correctly. If the EBI 205 is not operating correctly, there is no need to scrap the functional memory die 101 because the dies 101 and 202 have not yet been physically interfaced. If the EBI 205 (as well as any other tested components not shown here) are operating correctly, the memory die 101 can be stacked onto the logic die 202 to align and contact the TSVs 103, thereby integrating the dies 101, 202 into the chip package 200.

In some embodiments, the utility of the on-chip memory 204 does not end with testing, as the die 202 includes logic for using the on-chip memory 204 during normal use. Once the memory die 101 is stacked onto the logic die 202, the on-chip memory 204 can be used in any of variety of ways or simply disconnected and not used. Examples of uses for the on-chip memory 204 include, but are not limited to, being employed as supplemental memory, storing redundant bits for memory repair, storing memory parity bits, and being generally available for reconfiguration of the memory.

While the example of FIG. 2 is directed to the testing of an EBI, the scope of embodiments is not so limited. The concept can be extended to any die-to-die interface where a surrogate circuit, on a first die and in parallel with the connectivity to another device, is used to test out an interface to the other device.

Figure 3:
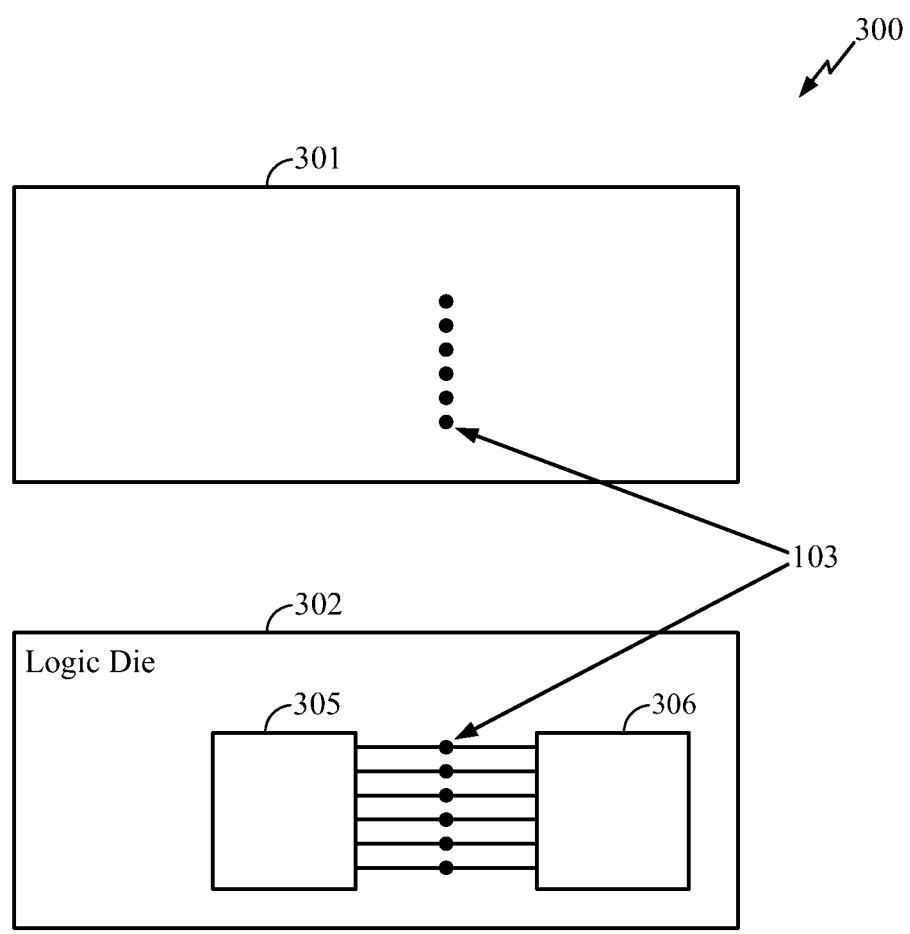
FIG. 3 is an exploded view of an exemplary configuration adapted according to one embodiment.

For instance, FIG. 3 is an exploded view of an exemplary configuration 300 adapted according to one embodiment. The configuration 300 includes a logic die 302 in communication with an interconnect fabric 301, such as a bus interconnect, a Bus Access Module (BAM), or crossbar interconnect. The logic die 302 includes a fabric interface 305 and a surrogate circuit 306. The surrogate circuit 306 is in parallel to the connectivity of the fabric interface 305 to the interconnect fabric 301. While not shown herein, the interconnect fabric 301 can be used to connect the logic die 302 to another component, such as a memory die or another logic die.

In the example of FIG. 3, the surrogate circuit 306 replicates characteristics of the interconnect fabric 301 at least to a degree that the fabric interface 305 communicates information to and from the surrogate circuit 306 in the same manner as it communicates information to and from the interconnect fabric 301. In one example, the fabric interface 305 is tested before the logic die 302 is physically interfaced to the interconnect fabric 301. The fabric interface 305 writes information to the surrogate circuit 306, and it is verified that the information is correctly written. If the fabric interface 305 is fully functional, a next action may include physically interfacing the interconnect fabric 301 with the logic die 302 to create the configuration shown in FIG. 3. Thus, the scope of embodiments is not limited to any particular interface for testing.

Various embodiments may find use in wide Input/Output (I/O) applications with thirty-two bits or more of I/O. In such applications it is often not feasible to test all the paths and all the I/Os using an external tester that is limited in its number of I/Os. However, some embodiments may take advantage of appropriate surrogate circuits to test functionality of I/Os. In a scenario where a wide I/O application has more interface signals than can be supported by an external tester, such surrogate circuits may be used to ensure that testing can be performed.

Furthermore, in some embodiments, a surrogate circuit is redundant to an external device once the external device is physically interfaced to the logic die. However, in other embodiments, various useful circuits may perform double duty as dedicated functional circuits during normal use of the logic die, as well as being used during testing. For instance, in one embodiment that tests a memory controller/interface (e.g., an EBI, as in FIG. 2), on-chip cache can be used as a surrogate for external memory, assuming the on-chip cache is connected to the memory controller/interface and is similar enough that the memory controller/interface can communicate information to and from the on-chip cache in the same manner as it would communicate information to and from an external memory. After the testing phase, and during normal use of the logic die, the on-chip cache is used as a dedicated on-chip cache.

Figure 4:
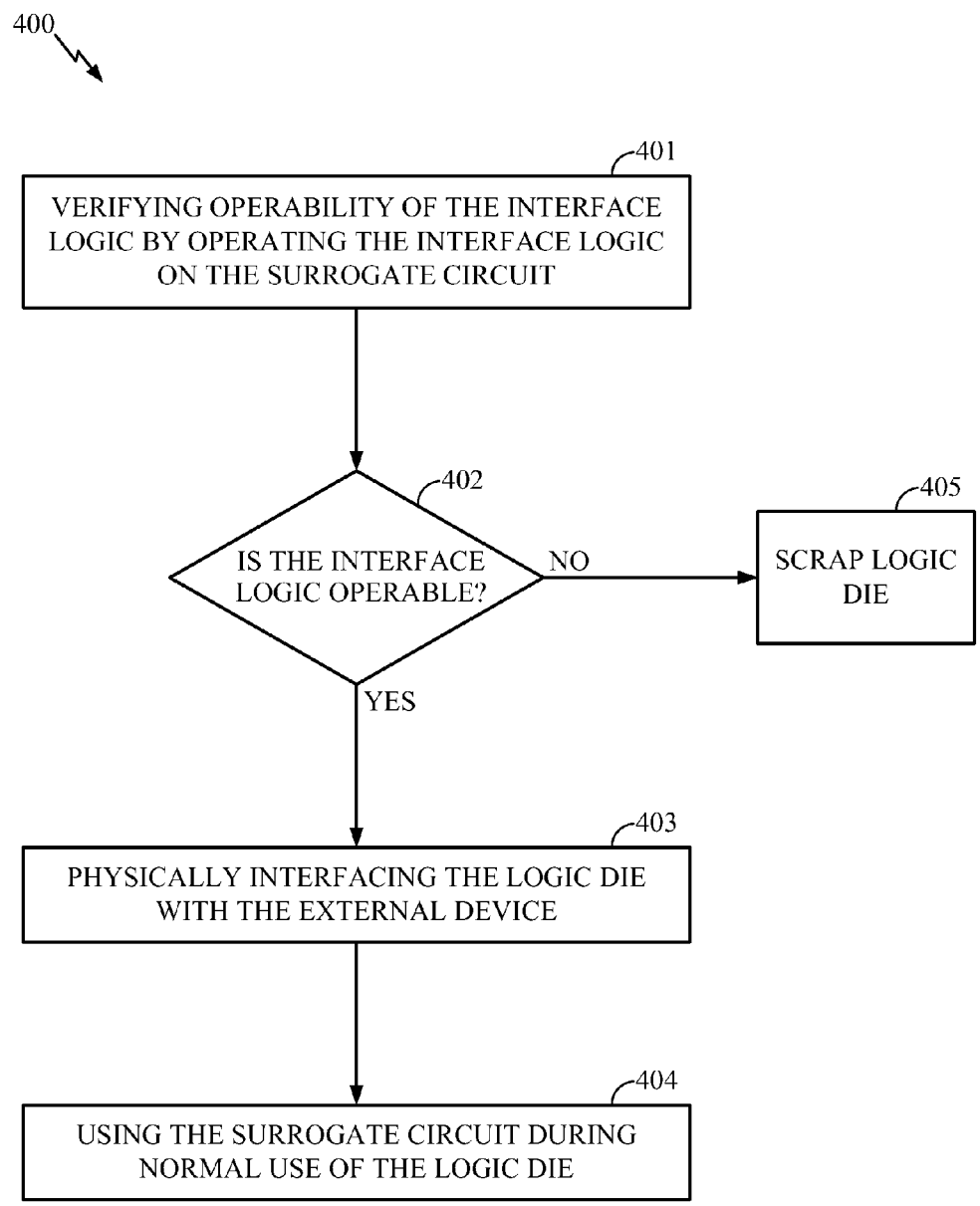
FIG. 4 is an illustration of an exemplary process adapted according to one embodiment.

Various embodiments include processes for testing and use of a logic die. FIG. 4 is an illustration of an exemplary process 400 adapted according to one embodiment. The process 400 can be performed on a logic die with a surrogate circuit and interface under logic test, examples of which are shown in FIGS. 2 and 3. The surrogate circuit is a surrogate for another external device, such as a memory die, an interconnect fabric, and/or the like. In various embodiments, the surrogate circuit replicates the functionality of the external device. For example, if the external device is a memory circuit, the surrogate circuit may also be a memory circuit that operates substantially similarly to the external device memory circuit. In another example, if the external device is a BAM, the surrogate circuit may be an interconnect fabric that operates substantially similarly to the BAM.

In block 401, testing is performed to verify operation of the interface logic. Operability of the interface logic is verified by operating the interface logic on the surrogate circuit in lieu of operating the interface logic on another external device.

The testing procedure itself can include conventional testing procedures and/or testing procedures later developed. Examples include uni-directional or bi-directional information transfer between the interface logic and the surrogate circuit and bit checking the transferred information, although the scope of embodiments is not limited to any particular testing procedure. Furthermore, any of a variety of testing devices, such as an external testing device and/or testing logic on the logic die, may administer the testing procedure.

In block 402, if the interface logic fails the operability testing, the logic die can be scrapped in block 405. Should the interface logic pass the operability testing, the logic die can then be interfaced with the external device in block 403. An example of interfacing the logic die and the external device includes die stacking, but embodiments are not limited to any particular technique for physically interfacing a logic die and an external device. Furthermore, various chip packages according to one or more embodiments may include more than two dies in a single package.

In some embodiments, the surrogate circuit is disconnected or otherwise not used after testing. In other embodiments, the surrogate circuit is used during normal operation of the logic die in block 404, such as for supplemental memory, for storing redundant bits, for storing memory parity bits, and for facilitating memory reconfiguration.

Although the process 400 is shown as a series of discrete actions, the scope of embodiments is not so limited. Embodiments may add, omit, rearrange, or modify various actions. For instance, some embodiments may perform the process 400 repeatedly to test a large number of logic dies. In another example, testing is performed by an entity separate from the entity that assembles the chip package, so that the tester sees the actions of blocks 403 and 404 as optional.

Various embodiments include advantages over conventional techniques. For example, while some conventional techniques perform interface testing only after dies have been physically coupled, various embodiments perform testing earlier in the process. As a result, such embodiments may identify faulty interfaces before irreversible packaging steps have been taken, thereby reducing waste.

Figure 5:
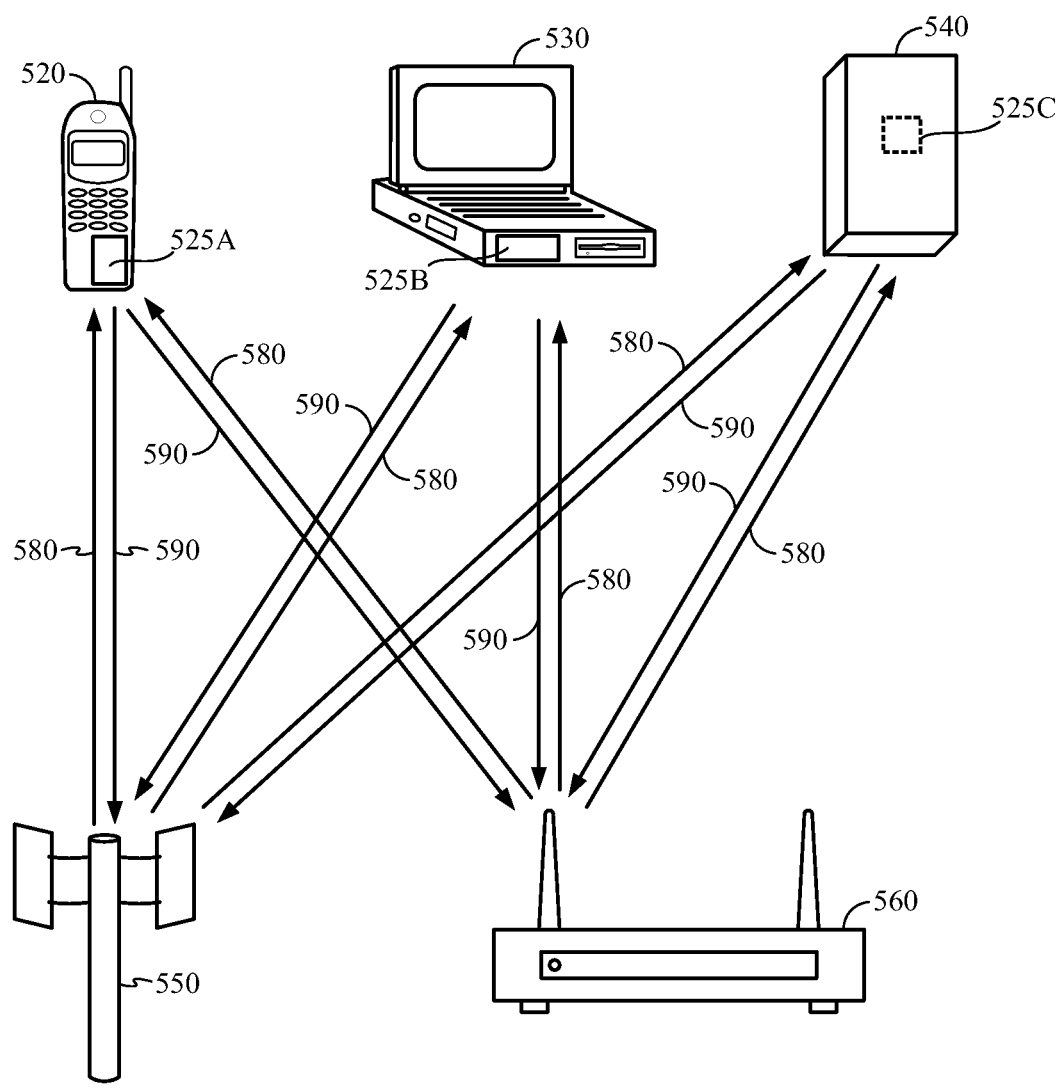
FIG. 5 shows an exemplary wireless communication system in which an embodiment of the disclosure may be advantageously employed.

FIG. 5 shows an exemplary wireless communication system 500 in which an embodiment of the disclosure may be advantageously employed. For purposes of illustration, FIG. 5 shows three remote units 520, 530, and 540 and two base stations 550, 560. It will be recognized that wireless communication systems may have many more remote units and base stations. The remote units 520, 530, and 540 include the chip packages 525A, 525B, and 525C, respectively, with surrogate circuits according to the embodiments discussed in more detail above. While not shown in FIG. 5, it is understood that the chip packages, according to the embodiments discussed above, can be included in the base stations 550, 560 as well. FIG. 5 shows the forward link signals 580 from the base stations 550, 560 and the remote units 520, 530, and 540 and the reverse link signals 590 from the remote units 520, 530, and 540 to base stations 550, 560.

In FIG. 5, the remote unit 520 is shown as a mobile telephone, the remote unit 530 is shown as a portable computer, and the remote unit 540 is shown as a computer in a wireless local loop system. For example, the remote unit 520 may include mobile devices, such as cell phones, hand-held personal communication systems (PCS) units, portable data units such as personal data assistants. The remote unit 520 may also include fixed location data units such as meter reading equipment. Although FIG. 5 illustrates remote units according to the teachings of the disclosure, the disclosure is not limited to these exemplary illustrated units. The disclosure may be suitably employed in any device which includes a die-to-die interface.

The methodologies described herein may be implemented by various components depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, including compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the technology of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A semiconductor die comprising:
   interface logic for performing a function on an external device; and
   a surrogate circuit in communication with the interface logic, the surrogate circuit configured to replicate characteristics of the external device, the interface logic being tested by executing on the surrogate circuit.

2. The semiconductor die of claim 1 comprising a logic circuit.

3. The semiconductor die of claim 2 in which the logic circuit comprises a processor.

4. The semiconductor die of claim 1 in which the interface logic comprises a memory controller, and the surrogate circuit comprises an on-chip memory.

5. The semiconductor die of claim 1 in which the interface logic is part of an interface structure that comprises at least one via.

6. The semiconductor die of claim 1 in which the semiconductor die includes logic to employ the surrogate circuit as at least one of the following:
   supplemental memory;

storage for redundant bits for memory repair;
storage for memory parity bits; and
supplemental memory for memory reconfiguration.

7. The semiconductor die of claim 1 in which the interface logic comprises a fabric interface, and the surrogate circuit comprises a replica of at least part of a bus access module.

8. The semiconductor die of claim 1 incorporated into a music player, a video player, an entertainment unit, a navigation device, a communications device, a personal digital assistant (PDA), a fixed location data unit, a portable location data unit, and/or a computer.

9. The semiconductor die of claim 1 integrated into a chip package with the external device.

10. A method for testing a die comprising controller logic for controlling an external device and an on-chip surrogate circuit, the method comprising:
communicating between the controller logic and the on-chip surrogate circuit, the on-chip surrogate circuit configured to replicate characteristics of the external device; and
verifying operability of the controller logic by executing the controller logic on the on-chip surrogate circuit.

11. The method of claim 10 further comprising:
physically interfacing the die with the external device.

12. The method of claim 10 further comprising operating the surrogate circuit according to at least one of the following functions:
storing redundant bits for memory repair; and
storing memory parity bits.

13. The method of claim 11 in which the die comprises a processor chip, and in which the external device comprises a memory chip, and in which physically interfacing the die with the external device comprises:
integrating the processor chip and the memory chip into a chip package.

14. The method of claim 10, further comprising incorporating the die into a music player, a video player, an entertainment unit, a navigation device, a communications device, a personal digital assistant (PDA), a fixed location data unit, a portable location data unit, and/or a computer.

15. A method for testing a die comprising controller logic compatible with an external device, and a surrogate circuit, the method comprising the steps of:
communicating between the controller logic and the surrogate circuit, the surrogate circuit configured to replicate characteristics of the external device; and
verifying operability of the controller logic by executing the controller logic on the surrogate circuit.

16. The method of claim 15 further comprising the step of: physically interfacing the die with the external device.

17. The method of claim 15 further comprising the step of operating the surrogate circuit according to at least one of the following functions:
storing redundant bits for memory repair; and
storing memory parity bits.

18. The method of claim 16 in which the die comprises a processor chip, and in which the external device comprises a memory chip, and in which the step of physically interfacing the die with the external device comprises the step of:
integrating the processor chip and the memory chip into a chip package.

19. The method of claim 15, further comprising the step of incorporating the die into a music player, a video player, an entertainment unit, a navigation device, a communications device, a personal digital assistant (PDA), a fixed location data unit, a portable location data unit, and/or a computer.

20. A semiconductor die comprising:
means for replicating characteristics of a memory device external to the semiconductor die; and
means for executing a function on the external memory device, the executing means being tested by operating with the replicating means.

21. The semiconductor die of claim 20 incorporated into a music player, a video player, an entertainment unit, a navigation device, a communications device, a personal digital assistant (PDA), a fixed location data unit, a portable location data unit, and/or a computer.

22. The semiconductor die of claim 20 integrated into a chip package with the external memory device.

23. A semiconductor die comprising:
means for performing a function on an external device; and
means for replicating characteristics of the external device, the replicating means in communication with the performing means, the performing means being tested by executing on the replicating means.

24. The semiconductor die of claim 23 incorporated into a music player, a video player, an entertainment unit, a navigation device, a communications device, a personal digital assistant (PDA), a fixed location data unit, a portable location data unit, and/or a computer.

* * * * *